(12) United States Patent
Richter

(10) Patent No.: US 9,795,524 B2
(45) Date of Patent: Oct. 24, 2017

(54) ASSISTIVE DRIVING SYSTEM FOR A WHEELCHAIR

(71) Applicant: Max Mobility, LLC, Antioch, TN (US)

(72) Inventor: Mark Richter, Nashville, TN (US)

(73) Assignee: MAX MOBILITY, LLC, Antioch, TN (US)

( * ) Notice: Subject to any disclaimer, the term of this patent is extended or adjusted under 35 U.S.C. 154(b) by 0 days.

(21) Appl. No.: 14/630,007

(22) Filed: Feb. 24, 2015

(65) Prior Publication Data

US 2016/0242977 A1 Aug. 25, 2016

(51) Int. Cl.
| | | |
|---|---|---|
| *A61G 5/04* | (2013.01) | |
| *H02P 31/00* | (2006.01) | |
| *B62M 6/50* | (2010.01) | |
| *A61G 5/02* | (2006.01) | |

(52) U.S. Cl.
CPC ............. *A61G 5/047* (2013.01); *A61G 5/048* (2016.11); *B62M 6/50* (2013.01); *H02P 31/00* (2013.01); *A61G 5/02* (2013.01); *A61G 2203/36* (2013.01)

(58) Field of Classification Search
USPC ......................................................... 318/466
See application file for complete search history.

(56) References Cited

U.S. PATENT DOCUMENTS

| | | |
|---|---|---|
| 2,448,992 A | 9/1948 | Love et al. |
| 2,495,573 A | 1/1950 | Duke |
| 3,905,437 A | 9/1975 | Kaiho et al. |

(Continued)

FOREIGN PATENT DOCUMENTS

| | | |
|---|---|---|
| DE | 300247 | 1/1917 |
| DE | 4323937 | 7/1993 |

(Continued)

OTHER PUBLICATIONS

B. D. Mayton, "WristQue: A Personal Sensor Wristband for Smart Infrastructure and Control," M.S. thesis, Dept. Architecture and Planning. MIT, Cambridge, MA, 2013. <http://resenv.media.mit.edu/pubs/theses/bmayton_thesis_final.pdf>.*

(Continued)

*Primary Examiner* — Eduardo Colon Santana
*Assistant Examiner* — Said Bouziane
(74) *Attorney, Agent, or Firm* — McAndrews, Held & Malloy, Ltd.

(57) ABSTRACT

The present disclosure describes a system for providing an assistive driving force to a wheelchair. The system comprises a power assist system which includes a motion sensing system that is configured to detect the motion of the power assist system, and hence of the wheelchair, and a power assist drive system that is configured to provide an assistive drive force. The system also comprises a sensor, such as may be embedded in a wearable wristband, that is configured to detect the motion of a user's hand and that is in communication with the power assist system. The system may be configured to determine whether the wheelchair is being manually pushed based at least in part on the user motion, and to activate an assistive drive force in response to a manual push. The system may also be configured to determine whether the wheelchair is being manually braked based at least in part on the user motion, and to deactivate an assistive drive force in response to a manual brake.

13 Claims, 5 Drawing Sheets

(56) References Cited

U.S. PATENT DOCUMENTS

| | | |
|---|---|---|
| 4,207,959 A * | 6/1980 | Youdin ............... A61F 4/00 180/167 |
| 4,260,035 A * | 4/1981 | Loveless ............. A61G 5/04 180/6.5 |
| 4,386,672 A | 6/1983 | Coker |
| 4,422,515 A | 12/1983 | Loveless |
| 4,652,026 A | 3/1987 | Byrge |
| 4,728,812 A * | 3/1988 | Sheriff ............... A61F 4/00 112/277 |
| 4,759,418 A | 7/1988 | Goldenfeld et al. |
| 4,767,940 A * | 8/1988 | Tuttle ............... A61G 5/045 180/167 |
| 4,823,900 A | 4/1989 | Farnam |
| 4,926,952 A | 5/1990 | Farnam |
| 5,113,959 A | 5/1992 | Mastov et al. |
| 5,135,063 A | 8/1992 | Kropf |
| 5,222,567 A | 6/1993 | Broadhead et al. |
| 5,234,066 A * | 8/1993 | Ahsing ............... A61G 5/045 180/11 |
| 5,244,051 A | 9/1993 | Wu |
| 5,351,774 A | 10/1994 | Okamoto |
| 5,366,037 A | 11/1994 | Richey |
| 5,494,126 A | 2/1996 | Meeker |
| 5,555,949 A | 9/1996 | Stallard et al. |
| 5,651,422 A | 7/1997 | Casali |
| 5,818,189 A | 10/1998 | Uchiyama |
| 5,826,670 A | 10/1998 | Nan |
| 5,878,829 A | 3/1999 | Kanno et al. |
| 5,927,414 A | 7/1999 | Kan et al. |
| 6,059,060 A | 5/2000 | Kanno et al. |
| 6,112,837 A | 9/2000 | Kanno et al. |
| 6,230,831 B1 | 5/2001 | Ogata et al. |
| 6,290,014 B1 | 9/2001 | MacCready, Jr. |
| 6,302,226 B1 | 10/2001 | Kanno et al. |
| 6,334,497 B2 | 1/2002 | Odell |
| 6,354,390 B1 | 3/2002 | Uchiyama et al. |
| 6,416,063 B1 | 7/2002 | Stillinger et al. |
| 6,459,962 B1 | 10/2002 | Ulrich et al. |
| 6,481,514 B2 | 11/2002 | Takada |
| 6,571,892 B2 | 6/2003 | Kamen et al. |
| 6,702,051 B2 | 3/2004 | Chu et al. |
| 6,729,421 B1 | 5/2004 | Gluck et al. |
| 6,729,422 B2 | 5/2004 | Chu et al. |
| 6,807,465 B2 | 10/2004 | Ulrich et al. |
| 6,842,692 B2 | 1/2005 | Fehr et al. |
| 6,860,347 B2 | 3/2005 | Sinclair et al. |
| 6,880,661 B1 | 4/2005 | Oh |
| 7,138,774 B2 | 11/2006 | Negoro et al. |
| 7,264,272 B2 | 9/2007 | Mulhern et al. |
| 7,311,160 B2 | 12/2007 | Lim |
| 7,383,107 B2 | 6/2008 | Fehr et al. |
| 7,383,904 B2 | 6/2008 | Wu |
| 7,404,465 B2 | 7/2008 | Hsieh |
| 7,425,007 B2 | 9/2008 | Johannes de Kruijf |
| 7,426,970 B2 | 9/2008 | Olsen |
| 7,566,102 B2 | 7/2009 | Guile |
| 7,581,604 B2 | 9/2009 | Torita |
| 7,648,156 B2 | 1/2010 | Johanson |
| 7,670,263 B2 * | 3/2010 | Ellis ............... A61B 5/1038 342/357.75 |
| 7,832,515 B2 | 11/2010 | Barthelt |
| 7,837,210 B2 * | 11/2010 | Kylstra ............... A61G 5/023 280/244 |
| 7,886,854 B2 | 2/2011 | Chiu |
| 7,976,049 B2 | 7/2011 | Chiu |
| 8,038,165 B2 | 10/2011 | Wang |
| 8,127,875 B2 | 3/2012 | Mattes et al. |
| 8,181,992 B2 | 5/2012 | Mulhern et al. |
| 8,186,463 B2 | 5/2012 | Hunziker et al. |
| 8,292,010 B2 | 10/2012 | Puskar-Pasewicz et al. |
| 8,292,678 B2 * | 10/2012 | Burgess, Jr. ....... A63C 17/0013 180/180 |
| 8,306,673 B1 * | 11/2012 | Manning ............. A63C 17/12 280/87.041 |
| 8,413,749 B2 | 4/2013 | Hsu |
| 8,430,189 B2 | 4/2013 | Tallino |
| 8,556,279 B2 | 10/2013 | McKinnon |
| 8,602,138 B2 | 12/2013 | Filkoski et al. |
| 8,652,009 B2 * | 2/2014 | Ellis ............... A61B 5/1038 482/1 |
| 8,758,191 B2 | 6/2014 | Takenaka et al. |
| 9,144,525 B2 | 9/2015 | Richter |
| 9,398,990 B2 | 7/2016 | Richter |
| 9,615,982 B2 | 4/2017 | Richter |
| 2002/0019686 A1 | 2/2002 | Ulrich |
| 2002/0036105 A1 | 3/2002 | Birmanns |
| 2002/0171559 A1 * | 11/2002 | Yang ............... H04B 1/202 340/12.3 |
| 2003/0226698 A1 | 12/2003 | Kamen et al. |
| 2004/0251649 A1 | 12/2004 | Wu |
| 2005/0000742 A1 | 1/2005 | Mulhern et al. |
| 2005/0077694 A1 | 4/2005 | Levi et al. |
| 2005/0137652 A1 * | 6/2005 | Cauller ............. A61B 5/0031 607/60 |
| 2005/0236208 A1 | 10/2005 | Runkles et al. |
| 2006/0244249 A1 * | 11/2006 | Goertzen ........... A61G 5/043 280/755 |
| 2006/0255581 A1 | 11/2006 | Goertzen et al. |
| 2007/0020985 A1 | 1/2007 | Naitou et al. |
| 2007/0039766 A1 | 2/2007 | Jackson et al. |
| 2007/0095580 A1 | 5/2007 | Liao |
| 2007/0095582 A1 | 5/2007 | Stuijt et al. |
| 2007/0131730 A1 | 6/2007 | Mirzale |
| 2007/0145711 A1 | 6/2007 | Mulhern et al. |
| 2007/0152427 A1 | 7/2007 | Olsen |
| 2007/0235234 A1 | 10/2007 | De Kruijf |
| 2007/0261897 A1 | 11/2007 | Torita |
| 2007/0283966 A1 * | 12/2007 | Maples ............. A61F 5/013 128/845 |
| 2008/0054596 A1 | 3/2008 | Johanson |
| 2008/0061627 A1 | 3/2008 | Spector et al. |
| 2008/0066974 A1 | 3/2008 | Pearlman et al. |
| 2008/0300777 A1 | 12/2008 | Fehr et al. |
| 2009/0050381 A1 | 2/2009 | Cheng |
| 2009/0194974 A1 | 8/2009 | Smith |
| 2010/0022908 A1 * | 1/2010 | Cauller ............. A61B 5/0031 600/544 |
| 2010/0036543 A1 | 2/2010 | Bitzer et al. |
| 2010/0301576 A1 | 12/2010 | Dugas et al. |
| 2011/0214929 A1 * | 9/2011 | Filkoski ............. B60K 1/02 180/65.1 |
| 2012/0012416 A1 | 1/2012 | Mirzaie |
| 2012/0068435 A1 | 3/2012 | Birmanns et al. |
| 2012/0080243 A1 | 4/2012 | Mulhern |
| 2012/0138376 A1 | 6/2012 | Zhou et al. |
| 2012/0143400 A1 * | 6/2012 | Hinkel, III ........... B62D 1/00 701/2 |
| 2012/0144554 A1 * | 6/2012 | Thellmann ......... A63B 21/4033 2/161.1 |
| 2012/0217081 A1 | 8/2012 | Mulhern et al. |
| 2012/0217713 A1 | 8/2012 | Molnar |
| 2013/0008732 A1 * | 1/2013 | Richter ............... A61G 5/04 180/167 |
| 2013/0080015 A1 | 3/2013 | Strothmann et al. |
| 2013/0218380 A1 * | 8/2013 | Phillips ............. B60L 11/1805 701/22 |
| 2013/0240271 A1 | 9/2013 | Tallino |
| 2013/0253769 A1 | 9/2013 | Kamo et al. |
| 2014/0058582 A1 | 2/2014 | Jaenke et al. |
| 2014/0262575 A1 | 9/2014 | Richter |
| 2015/0298765 A1 | 10/2015 | Golden, Jr. |
| 2017/0027785 A1 | 2/2017 | Richter |

FOREIGN PATENT DOCUMENTS

| | | |
|---|---|---|
| DE | 29907846 | 9/1999 |
| EP | 1854443 | 11/2007 |
| JP | 06304205 | 11/1994 |
| JP | 09285501 | 11/1997 |
| JP | 10314234 | 12/1998 |

(56) References Cited

FOREIGN PATENT DOCUMENTS

| | | |
|---|---|---|
| JP | 2000084007 | 3/2000 |
| JP | 2003052760 | 2/2003 |
| JP | 2009078044 | 4/2009 |

OTHER PUBLICATIONS

Mayton et al., (B. D. Mayton, N. Zhao, M. Aldrich, N. Gillian and J. A. Paradiso, "WristQue: A personal sensor wristband," Body Sensor Networks (BSN), 2013 IEEE International Conference on, Cambridge, MA, USA, 2013, pp. 1-6. URL: http://ieeexplore.ieee.org/stamp/stamp.jsp?tp=&arnumber=6575483&isnumber=6575455.*

International Search Report and Written Opinion of International Search Authority, PCT/US2014/010819, Mailed May 12, 2014.

Extended European Search Report for Application No. EP16156948, dated Jul. 7, 2016, 7 pages.

Lutin. Smart Drive Power Assist Wheel DEMO. YouTube. Oct. 23, 2012. Retrieved from internet: <URL:http://www.youtube.com/watch?v=3RbaFns4iXQ>.

* cited by examiner

ASSISTIVE DRIVING SYSTEM FOR A WHEELCHAIR

BACKGROUND

Manual wheelchairs are the primary mode of locomotion for millions of people around the world. Upper limb pain and injury is very common among these manual wheelchair users and can severely impact mobility, independence, and quality of life. The most common types of injury are impingement syndrome of the shoulder and carpal tunnel syndrome of the wrist. Upper limb pain and injury is an emotionally, physically, and financially costly problem.

Wheelchair propulsion is one activity that has been associated with the development of these upper extremity injuries. It is recommended that users reduce how hard they push on the hand rim and to do it less frequently in order to reduce the stresses of propulsion on the upper body.

Power attachment units can mount to manual wheelchairs to assist in propulsion. An example of one such power add-on is disclosed in U.S. Pat. No. 4,759,418, which employs a linkage system that mounts to the wheelchair frame and trails in between the two rear wheels. An electric motor powers a drive wheel that is controlled by a push button located within reach of the user. This type of design, not common to all power attachments, also employs a steering bar that attaches to the front casters in order to guide the wheelchair when being driven by the power add-on. These electric drive attachments are known to be successful in helping to reduce the physical effort needed for propulsion. A drawback is that these types of systems completely eliminate the need for pushing because the user drives the wheelchair, rather than maneuvers it through pushes. In this situation, the user does not benefit from the physical exercise of manual propulsion or the psychological benefits of not being dependent on the device for transportation.

Another example of a power attachment device is push-activated power assist wheels. These combine the benefits of manual push operation by the user and power assistance to reduce the demand on the user's upper extremities during propulsion. Push-activated power assist wheels, similar to those disclosed in U.S. Pat. No. 5,818,189, are battery powered wheels that employ either force or torque sensors, or both, to measure the force applied to the hand rims from the user and amplify that force through the use of motors embedded in the wheels to drive the wheelchair forward or backward. This technology has been shown to have a number of positive effects on wheelchair users, including reduced energy expenditure, reduced push cadence, reduced muscle activation, decreased range of motion, easier hill climbing, increased propulsion speed, and reduced pain during propulsion for those users already experiencing pain. One drawback with this approach, however, is that the employment of force and torque sensors to recognize and quantify the amplitude of the push significantly complicates the design, adding costs and weight. Additionally, because measurements are focused on the hand rim, hazardous situations can be escalated by the assistive power.

Another power assistance system is disclosed in U.S. Patent Application Publication No. 2013/0008732 A1, the entirety of which is incorporated herein by reference. The motion-based push activation power assist system disclosed in U.S. Patent Application Publication No. 2013/0008732 A1 uses motion-based measurements to determine when the user applies a push to the wheelchair hand rims and brakes with the hand rims. The push recognition activates a drive system that provides an assistive driving force to the wheelchair to reduce the demand on the user during propulsion. The brake recognition deactivates the power assist. The provided power assist is proportional to the sensed push and can be modulated to different proportional settings.

A motion assistance system for driving a wheelchair is also disclosed in US Patent Application Publication No. 2014/0262575 A1, the entirety of which is incorporated herein by reference. In certain embodiments of the system disclosed in US Patent Application Publication No. 2014/0262575 A1, a user may control a motion assistance system through a control switch, The control switch may be located on or around the seat or on the push rim of the wheelchair. The control switch may also be a remote control, including for example a wrist remote control that can be worn on the wrist or forearm of a user. The user may thus activate and/or deactivate the motion assistance system by pressing a button, activating a switch, pressing onto a throttle, and the like.

Certain aspects of the presently disclosed system provide a power assistance system that gives a user an enhanced degree of control over the activation and deactivation of an assistive driving force.

SUMMARY

The present disclosure describes a system for providing an assistive driving force to a wheelchair. In certain aspects, the system comprises a power assist system. The power assist system may include a motion sensing system that is configured to detect the motion of the power assist system, which is integrated with a wheelchair. The power assist system may also include a power assist drive system, which is capable of providing the wheelchair with an assistive drive force. The system also comprises a sensor, the sensor being configured to detect the motion of a user's hand. The sensor is configured to communicate with the power assist system.

Certain aspects of the present technology provide an assistive driving system that utilizes a sensor that is configured to detect the motion of a user's hand. In some embodiments, the sensor may be worn by the user. For instance, the sensor may be incorporated into a wristband that is worn by the user. The sensor may comprise one or more accelerometers, one or more gyroscopes, and/or one or more magnetometers. In some embodiments, the sensor may communicate with the power assist system through a wireless connection.

Certain aspects of the present technology provide an assistive driving system that is configured to determine if a wheelchair is being manually pushed based, either in whole or in part, on the motion detected by a sensor that is configured to detect the motion of a user's hand. For instance, in some embodiments the system may be configured to determine if the wheelchair is being manually pushed through a combination of (a) a detected acceleration of the power assist system and (b) the detected user motion. The system may thus be configured to activate an assistive drive force if the acceleration of the power assist system indicates a manual push and the user motion indicates a manual push. In some embodiments, the level of the assistive drive force may also be based, either in whole or in part, on the user motion detected by the sensor.

Certain aspects of the present technology provide an assistive driving system that is configured to determine if a wheelchair is being manually braked based, either in whole or in part, on the motion detected by a sensor that is configured to detect the motion of a user's hand. For instance, in some embodiments the system may be configured to determine if the wheelchair is being manually braked through a combination of (a) a detected deceleration of the power assist system and (b) the detected user motion. Alternatively, in some embodiments the system may be configured to determine if the wheelchair is being manually braked based on the user motion detected by the sensor. The system may thus be configured to deactivate an assistive drive force in response to a user motion that indicates a manual brake, such as a tap of the hand against a push rim of the wheelchair.

In some embodiments, the assistive driving system may comprise a motion sensing system that is configured to detect the motion of the wheelchair, a sensor configured to detect the motion of a user's hand, and a power assist drive system that is capable of providing the wheelchair with an assistive driving force. The system may be configured to determine whether the wheelchair is being manually pushed and/or manually braked based at least in part on the user motion detected by the sensor. Accordingly, the system may be configured to activate an assistive drive force in response to a manual push and/or deactivate an assistive drive force in response to a manual brake.

Certain aspects of the present technology provide a wheelchair having an embodiment of the presently disclosed assistive drive force system.

DETAILED DESCRIPTION

The presently disclosed technology relates generally to an assistive driving system for a manual wheelchair. Motion-based instrumentation measures the kinematics of the power assist system. The kinematics measured include, but are not limited to, linear velocities, angular velocities, linear accelerations, and angular accelerations. These parameters are quantified using a range of instruments, including but not limited to, gyroscopes, encoders, potentiometers, inertia measuring units, and multi-axis accelerometers. From these motion-based measurements, push activation can be recognized.

Figure 1:
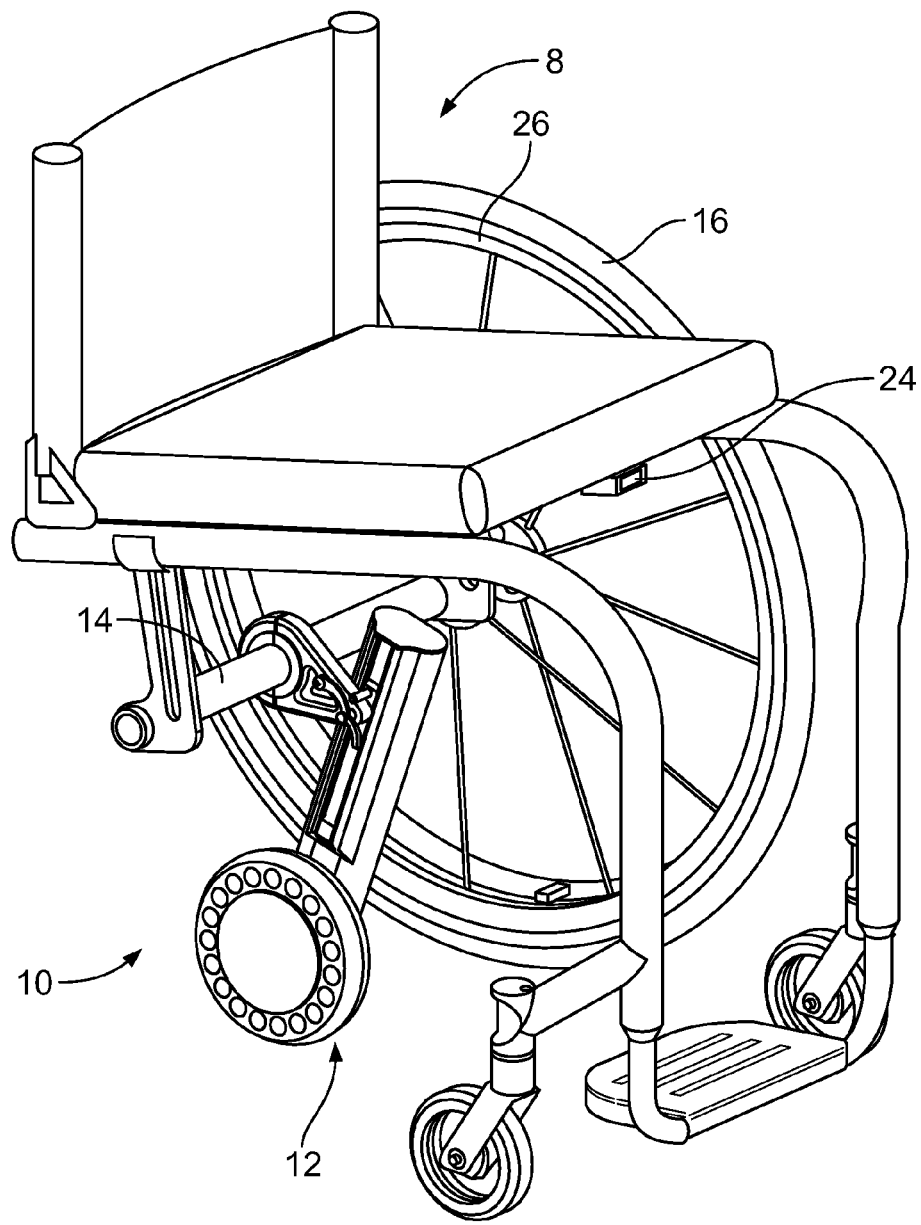
FIG. 1 shows an isometric view of an embodiment of a power assist system comprising a single drive wheel power assist attachment and remote control device mounted to a generic wheelchair. One of the rear wheels is removed for clarity.

Push activation recognition employs the principle that when the user is applying a push to the rim mounted hand rim 26, or push rim, of typical wheelchair rear wheels 16 on a generic manual wheelchair 8, as shown in FIG. 1, the wheelchair rear wheels 16 are being accelerated by the user. If the rear wheels 16 are experiencing an angular acceleration then the wheelchair 8 and all onboard parts will experience acceleration. Because the wheelchair is accelerating, the power assist which is connected to it will also accelerate. If the power assist acceleration measurements are found to be above a certain threshold, a user push will be recognized. Similarly, if the power assist deceleration measurements are found to be above a certain threshold, a user brake will be recognized. The push recognition triggers the activation of an assistive drive force to help in the propulsion of the wheelchair 8 and the user, in the wheelchair, that is performing the push. The magnitude, or level, of the assistive drive force provided will be related to the manual power input as calculated from the motion-based sensors. In one approach, the power assist drive is set to the speed reached during the user's push. When user braking is detected, the provided power is discontinued.

Figure 2:
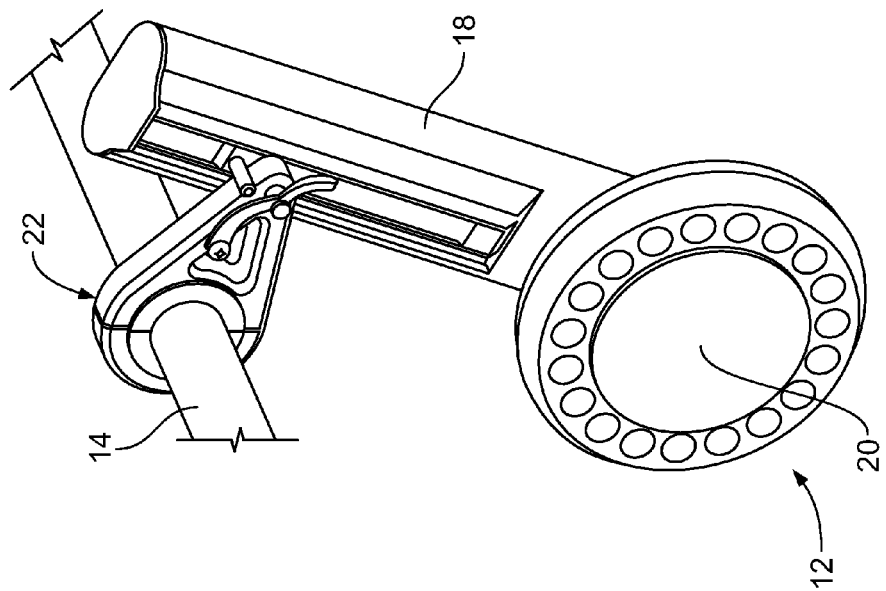
FIG. 2 shows an enlarged view of the single drive wheel power assist attachment of FIG. 1 mounted to the axle bar of a wheelchair frame.

FIGS. 1 and 2 show an embodiment of the power assist system employing the motion-based push activation. The power assist system 10, which in this embodiment comprises a single wheel power assist drive attachment 12, is shown mounted on a generic wheelchair 8, comprising a drive linkage 18, an electric hub drive wheel 20, a mounting attachment 22, and a remote control device 24.

The power assist drive attachment 12 is positioned between the wheelchair drive wheels 16 such that the electric drive wheel 20 contacts the ground at a point midway between the wheelchair drive wheels 16. This positioning prevents the wheelchair from turning or drifting when an assistive force is provided, while not significantly hindering the rotation of the chair when desired for maneuvering. The single wheel power assist attachment 12 and drive linkage 18 are also angled such that as the drive wheel power is increased, the wheel digs into the ground for ideal traction control.

The electric drive wheel 20 mounts to the distal end of the drive linkage 18, which is pivotally attached to the wheelchair axle bar 14 through the mounting attachment 22. While FIG. 1 and FIG. 2 show an embodiment with a singular mount attachment 22, in other embodiments a plurality or multitude of mounting attachments may be used to connect the drive linkage 18 to the wheelchair. In some embodiments, a remote control device 24 may comprise part of the power assist system 10 and be used to turn the unit on/off and modulate between multiple configuration settings for providing different amounts of driving force related to the sensed acceleration of the power assist system from the push of the user.

Figure 3:
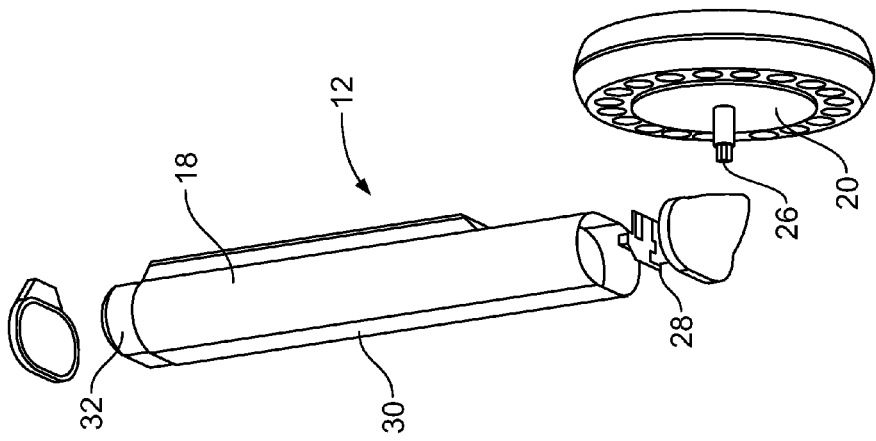
FIG. 3 shows an exploded assembly view of the single drive wheel power assist attachment of FIG. 1 removed from the wheelchair.

An exploded assembly of an embodiment of a power assist drive attachment 12 is shown in FIG. 3, which was originally presented in US Patent Application Publication No. 2013/0008732 A1, the entirety of which is incorporated herein by reference. In this embodiment, the power assist drive system comprises a drive linkage 18 having a shell or frame 30, a battery pack 32, circuit board 28, and electric hub motor 20. The primary role of the circuit board 28 is to receive sensor measurements, process those measurements to determine whether the users is pushing or braking, and then deliver the appropriate amount of power from the battery 32 to the motor 20. A motion sensing system configured to detect the motion of the power assist system can include inertial measurement units (gyroscopes, accelerometers and magnetometers) on the circuit board 28, rotational position sensors (optical encoders, Hall Effect sensors, or reed switches) in the drive motor 20, or inertial measurement units on another portion of the power assist system, for example the remote control device 24.

Embodiments of the power assist drive attachment 12, such as those presented in US Patent Application Publication No. 2014/0262575 A1, the entirety of which is incorporated herein by reference, are also contemplated for use with the presently disclosed system. In some embodiments, for example, the battery pack 32 or an extra battery pack may be configured to slide under the seat and connect, via a cord or wire, to the drive linkage 18. Although the embodiment shown in FIG. 3 shows the components of the power assist system incorporated into the drive linkage 18, various components of the power assist system may be incorporated into a unit that is attached to the wheelchair at other locations, such as under the seat.

Figure 4:
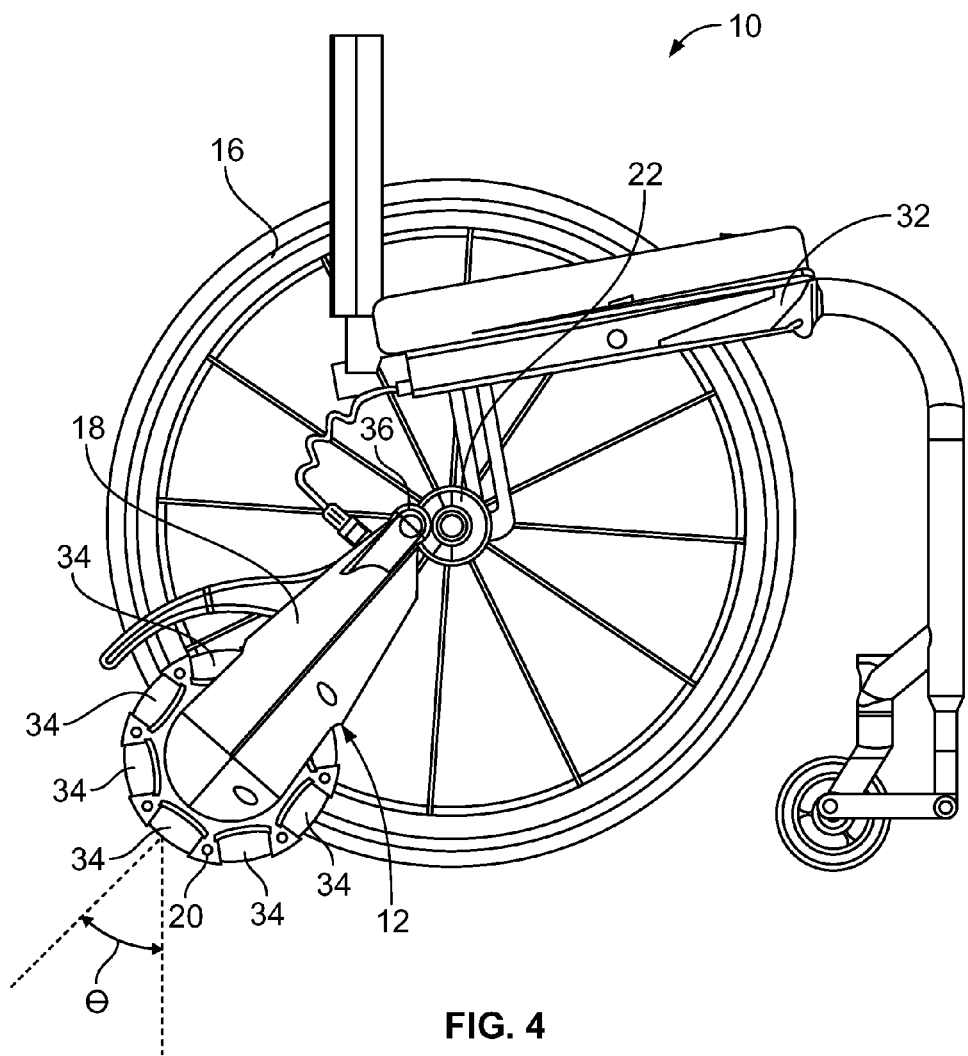
FIG. 4 shows a side view of a wheelchair equipped with a power assist system in accordance with an embodiment of the present technology.

Embodiments of the power assist drive attachment 12 may also comprise a drive unit, such as that shown in FIG. 4, which was originally presented in US Patent Application Publication No. 2014/0262575 A1. For instance, the power assist system can include a drive linkage 18 that can attach to a mounting mechanism 22 (e.g., a mounting attachment or a hitch), which can be attachable to one or more structural elements of a wheelchair. For example, the mounting mechanism 22 can be clamped to a support bar, an axle bar, or the like. In some embodiments, the mounting mechanism may be an expanding connector bar that is attachable and detachable to one or more structural elements of the wheelchair. The drive linkage 18 can be attachable and detachable from the mounting mechanism 22 via a hinge 36, for example.

The drive wheel 20 can include multiple lateral rollers 34 positioned radially about the circumference of the drive wheel 20. The lateral rollers 34 can be rotatable about an axis that is tangential to the circumference of the drive wheel 20 such that, when the drive wheel is placed on a surface, the drive wheel can freely slide in a direction parallel to the rotational axis of the drive wheel. Because the lateral rollers 34 rotate freely about an axis tangential to the circumference of the drive wheel 20, the drive wheel can slide in a direction parallel to the center axis of the drive wheel while in contact with the ground. The lateral rollers 34 can also provide traction between the drive wheel 20 and the ground when the drive wheel is driving or rolling about the center axis of the drive wheel. In some embodiments, the drive wheel 20 can also include more than one wheel. For instance, the drive wheel 20 may, in some embodiments, comprise two wheels, with one or both of the wheels having lateral rollers 34.

Figure 5A:
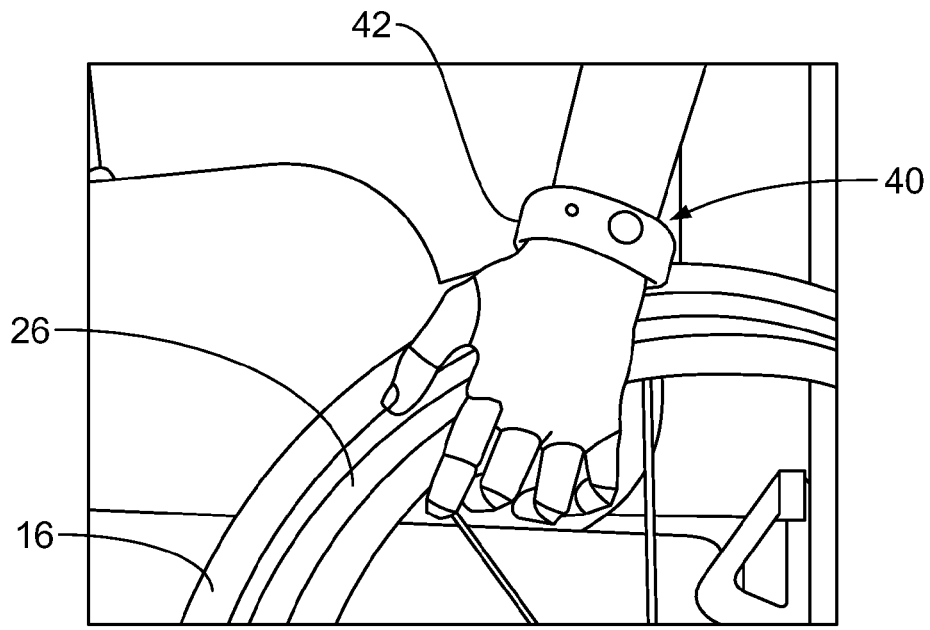
FIG. 5A shows a perspective view of a sensor configured to detect the motion of a user's hand in accordance with an embodiment of the present technology.
Figure 5B:
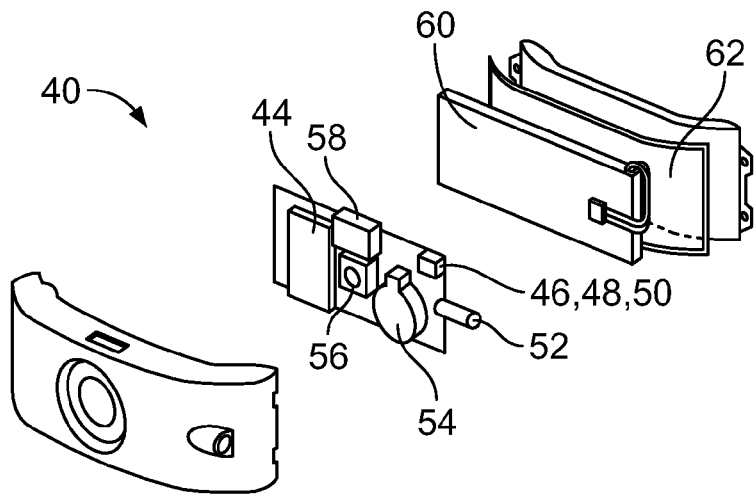
FIG. 5B shows an exploded assembly view of a sensor configured to detect the motion of a user's hand in accordance with an embodiment of the present technology.

With reference to FIGS. 5A and 5B, and in addition to the power assist system 10, embodiments of the presently disclosed technology include one or more additional sensors 40. Each of the one or more additional sensors 40 may be configured to detect the motion of a user's hand. As used herein, the motion of a user's hand should be interpreted broadly to include the motion of a body part that reliably approximates the motion of a user's hand. In other words, the sensor 40 may, but need not, be configured to directly detect the motion of a user's hand, such as by being configured to be held by a user or attached to the user's hand. Rather, for example, a sensor 40 may be configured to be worn on a user's wrist or lower arm and still be configured to detect the motion of a user's hand. In alternative embodiments, one or more additional sensors 40 may be configured to detect the motion of a user's arm and/or shoulder. And in some embodiments, multiple sensors, e.g. the combination of a wrist-worn sensor and an upper-arm worn sensor or the combination of a wrist-worn sensor and a finger-worn sensor, could be used to provide enhanced user motion data.

It is contemplated that, in some embodiments, each of a first sensor 40, configured to detect the motion of a user's first (e.g., right) hand, and a second sensor, configured to detect the motion of a user's second (e.g., left) hand, could be provided. In many embodiments, however, the system may only include a single sensor 40, since the motion of one hand is typically suitable to provide the information that may be used to determine if a wheelchair is being manually pushed or braked. In some embodiments, the sensor 40 may be configured to detect the motion of either the user's right hand or left hand, allowing one to use the sensor with either hand.

The sensor 40 may also be configured to communicate with the power assist system. For example, in embodiments of the present technology, the sensor 40 is configured to transmit information relating to the motion of a user's hand to the power assist system using wireless communication technology. The type of wireless communication technology is not limited and may be selected from those generally known in the art, such as Wi-Fi, Bluetooth or other radio wave-based wireless, induction wireless, infrared wireless, ultra wideband (UWB), or the like. Accordingly, in some embodiments, the sensor 40 may comprise a wireless transmitter 44. As illustrated in FIG. 5B, for example, the wireless transmitter 44 may be incorporated into a circuit board that also comprises the one or more elements that make up the sensor 40. The sensor 40 may also be configured to transmit information relating to the motion of a user's hand to the power assist system through a wired connection between the power assist system and the sensor.

In embodiments of the present technology, the sensor 40 may be configured to be worn by a user. For example, the sensor 40 may be configured to be worn on the hand (e.g. the palm of the hand, the fingers, etc.), wrist, or forearm. In some embodiments, the sensor 40 may comprise a wristband 42. The sensor 40 may be incorporated with a wristband 42 in any number of ways. For example, in some embodiments the sensor 40 can comprise a compliant band that is stretchable and/or bendable, which makes it easy to take the wristband on and off. The band can also have a non-slip portion on an inner surface designed to keep the sensor 40 from unintended movement on the wearer (unintended movement of the wristband on the wearer's wrist or arm may introduce undesirable noise into the detected motion). For example, the non-slip portion can comprise a material such as rubber that provides friction between the wristband and the arm/wrist of a wearer, preferably without sacrificing comfort to the wearer. In other embodiments, the wristband 42 may comprise a clasp or other mechanism for securing the wristband to a wearer's arm. And in some embodiments, the sensor may be incorporated into a wristwatch or an existing wristband such as a bracelet or armlet. In other embodiments, the sensor 40 may be configured to be worn on a user's upper arm.

The sensor 40 may be configured to detect, and in some embodiments measure, a variety of motions across numerous planes. The sensor 40 may comprise one or more accelerometers 46 and one or more gyroscopes 48. The sensor 40 may also comprise one or more magnetometers 50. For instance, the sensor 40 may include an inertial measurement unit (IMU). In some embodiments, the IMU may be a three-axis IMU, which comprises three accelerometers, three gyroscopes, and optionally three magnetometers. The sensor may also comprise a power source, such as a battery 60.

In some power assist systems, the acceleration and deceleration of the power assist system (and hence of the wheelchair to which the system is incorporated) may be used to determine when the user manually pushes or manually brakes the wheelchair. For example, determination of the linear acceleration of the wheelchair could be accomplished by frequently sampling the rotational position of the drive wheel 20, differentiating discrete samples to derive the rotational speed, and then differentiating rotational speed values to determine the rotational acceleration of the wheel (the linear acceleration of the wheelchair being directly related to the rotational acceleration of the drive wheel 20).

The use of these wheelchair motion-based measurements to determine when the user applies a push to the wheelchair hand rims 26 or brakes with the hand rims, however, is subject to some potential complexities. For example, the power assistance system may register a manual push even when no manual push has been performed, i.e. a false positive, such as when the wheelchair 8 accelerates due to movement downhill, movement off of a curb, movement over a bump, or the like. Similarly, the power assistance system may register a manual brake even when no manual brake has been performed, i.e. a false negative, such as when the wheelchair 8 decelerates due to movement uphill, movement from a hard surface onto a carpeted surface, movement through a sharp turn, or the like.

By using data from the additional sensor 40 in determining when a manual push or a manual brake has occurred, the system of the presently disclosed technology is not subject to these same false positives and false negatives. Accordingly, the system of the presently disclosed technology may provide a more accurate and reliable indication of when a user manually pushes and/or manually brakes a wheelchair 8.

Figure 6:
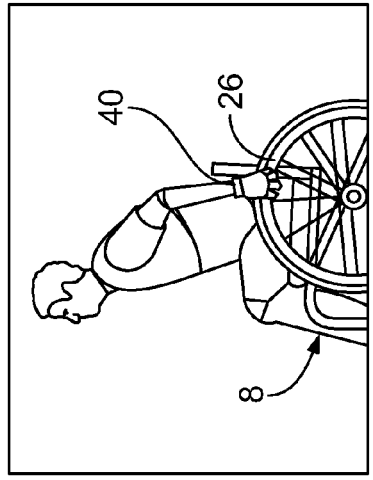
FIG. 6 shows a side view of a user motion that, in accordance with an embodiment of the present technology, indicates a manual push of a wheelchair.
Figure 6:
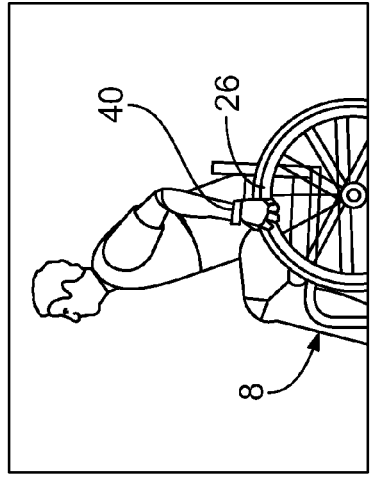
Figure 6:
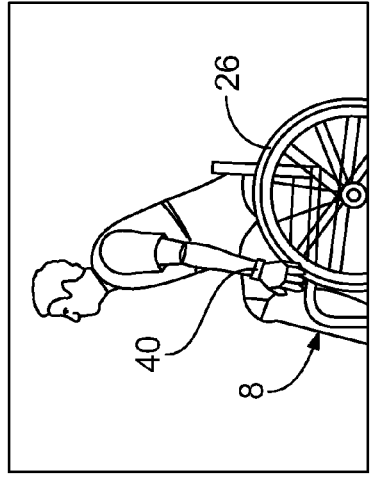

To perform a manual push, a user will typically grab the hand rims 26 of the wheelchair 8 and move his arms in a sweeping motion, such as that shown in FIG. 6. Accordingly, the system may be configured to detect and register a motion of the sensor 40 that is consistent with this user movement. In embodiments of the present technology, the system is configured to determine if the wheelchair is being manually pushed based, at least in part, on the user motion detected by the sensor 40. For example, in some embodiments the system may be configured to register a manual push movement when the sensor 40 detects a sweeping motion, such as that shown in FIG. 6, having a speed or acceleration that is above a certain lower threshold, such as an increase in speed that is at least about 0.2 m/s over at least a 0.1 second period.

In some embodiments, the system may be configured to determine if the wheelchair is being manually pushed using a combination of (a) a detected acceleration of the power assist system 10, and (b) the user motion detected by the sensor 40. Accordingly, the system may be configured to activate an assistive drive force only if both (1) the acceleration of the power assist system 10 indicates that a manual push has occurred and (2) the user motion detected by the sensor 40 indicates that a manual push has occurred. For instance, when an acceleration of the power assist system 10, i.e. the acceleration of the wheelchair, is of the sort to register that a manual push has occurred, data from the sensor 40 may be analyzed in order to confirm whether or not a manual push has occurred. If the data from the sensor 40 is representative of a manual push, the system may activate an assistive drive force. However, if the data from the sensor 40 is not representative of a manual push, the system may not activate an assistive drive force. In this way, activation of an assistive drive force in response to wheelchair acceleration associated with sources other than a manual push performed by the user may be avoided.

Although the above description involves an order of analysis (acceleration of the power assist system indicating a push is checked against user motion data), the system is not limited to any particular order of analysis. Rather, a user motion indicating a push may be checked against the acceleration data, or both variables may be analyzed at the same time.

Figure 7:
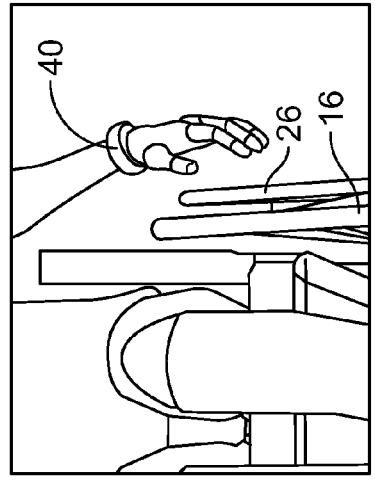
FIG. 7 shows a front view of a user motion that, in accordance with an embodiment of the present technology, indicates a manual brake of a wheelchair.
Figure 7:
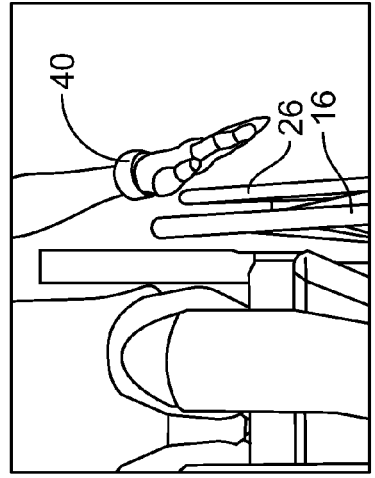
Figure 7:
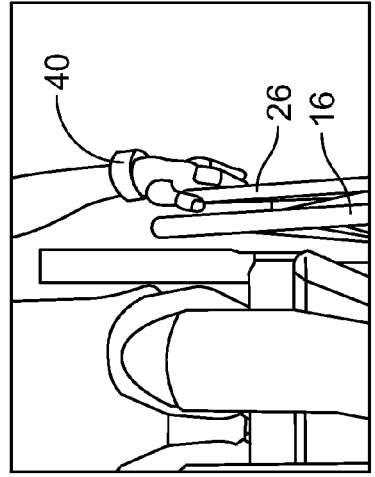

To perform a manual brake, a user will typically grab the hand rims 26 of the wheelchair 8 and hold his or her hands in place in order to slow or stop the rotation of the rear wheels. This motion typically involves a movement of the user's hand, such as that shown in FIG. 7, toward the hand rim 26 of the wheelchair that ends abruptly when the user reaches and grabs the hand rim. Accordingly, the system may be configured to detect and register a motion of the sensor 40 that is consistent with this user movement. In embodiments of the present technology, the system is configured to determine if the wheelchair is being manually braked based, at least in part, on the user motion detected by the sensor 40. For example, in some embodiments the system may be configured to register a manual brake movement when the sensor 40 detects a motion toward the hand rim 26 of the wheelchair that has a deceleration (due to a tapping of the hand rim) above a certain lower threshold, such as at least about 20 m/s$^2$ over at least a 0.1 second period.

In some embodiments the system may be configured to determine if the wheelchair is being manually braked using a combination of (a) a detected deceleration of the power assist system 10, and (b) the user motion detected by the sensor 40. Accordingly, the system may be configured to deactivate an assistive drive force only if both (1) the deceleration of the power assist system 10 indicates that a manual brake has occurred and (2) the user motion detected by the sensor 40 indicates that a manual brake has occurred. For instance, when a deceleration of the power assist system 10, i.e. a deceleration of the wheelchair, is of the sort to register that a manual brake has occurred, data from the sensor 40 may be analyzed in order to confirm whether or not a manual brake has occurred. If the data from the sensor 40 is representative of a manual brake, the system may deactivate or reduce an assistive drive force. However, if the data from the sensor 40 is not representative of a manual brake, the system may not deactivate an assistive drive force. In this way, deactivation of an assistive drive force in response to wheelchair deceleration associated with sources other than a manual brake performed by the user may be avoided.

Although the above description involves an order of analysis (deceleration of the power assist system indicating a brake is checked against user motion data), the system is not limited to any particular order of analysis. Rather, a user motion indicating a brake may be checked against the deceleration data, or both variables may be analyzed at the same time.

In other embodiments, the system may be configured to deactivate an assistive drive force in response to a user motion that corresponds to a manual brake, such as a tap of the hand against a push rim. As soon as a user motion that corresponds with a manual brake is detected, the assistive drive force may be deactivated or reduced, whether or not a representative deceleration has also been detected. In this way, the system may provide a braking feature having an enhanced sensitivity. This may be particularly advantageous where a user may have limited strength, as it will serve to prevent the user from having to apply a force that is sufficient to act against the assistive drive force to decelerate the wheelchair.

The use of the sensor 40 to register a manual brake and thus deactivate an assistive drive force may also provide the system with a more effective and user-friendly braking feature. For example, in some power assist systems, a control switch or button may be used to perform certain functions, including deactivating an assistive drive force. In embodiments of the present technology, however, deactivation of an assistive drive force may be achieved by a user performing a natural braking motion. Thus, in a dangerous situation, for example, the user will not need to remember to make any additional (and potentially unnatural) movements to push a button, flip a switch, or the like. Rather, the movement of the sensor 40 that results from a user's natural and instinctive braking motion may be sufficient to deactivate an assistive drive force.

In some embodiments, the user motion detected by the sensor may also be used to determine the level, i.e. magnitude, of the assistive drive force. In this way, the sensor 40 may also provide the system with an improved drive force speed setting. In some embodiments, for example, the assistive drive force provided may be calculated based on the motion of the wheelchair. For example, the power assist drive might be set to the maximum speed reached during the user's push. However, by taking into account data from the sensor 40 in determining the level at which to set the assistive drive force, the system of the presently disclosed technology may provide a more accurately matched speed. The sensor 40 data may also be used to provide a more seamless transition between speed reached by the manual push and the activation of the assistive drive force.

The system may also be configured so that the level of assistive drive force is based, at least in part, on the user motion detected by the sensor. The range of motion of a user's hand, including for example the direction, speed, etc. of the push motion, may be measured by the sensor 40 and used to indicate the desired acceleration that the user intended to achieve. In some embodiments the system may be configured to determine the level at which the assistive drive force is set using a combination of (a) the measured acceleration of the power assist system 10, and (b) the user motion measured by the sensor 40. And in some embodiments, the system may be configured to allow the user to increase the level of an assistive drive force by performing a manual push, or a manual push motion, during the operation of an existing assistive drive force.

In some embodiments, the system can be configured to be programmable, such that the system could be tailored to a specific individual. In this way, the system may be configured to most accurately register the sensor 40 data that is indicative of a manual push and/or a manual brake by a particular user. The system may also comprise a "smart" system, i.e. be configured to use data from the power assist system 10 and the sensor 40 in order to "learn" which sensor data is indicative of a manual push and/or a manual brake by a particular user.

The sensor 40 may also comprise any number of additional components, each of which may provide the presently disclosed technology with additional functionality and user benefits. In some embodiments, for example, the sensor 40 may include one or more user notification components. The one or more user notification components may be configured to notify a user when a manual push has been recognized (and thus when an assistive drive force has been activated or the level of the assistive drive force increased), when a manual brake has been recognized (and thus when an assistive drive force has been deactivated or the level of the assistive drive force reduced), or both. The one or more user notification components may also notify a user when a battery—either the battery of the power assist system 32, the battery of the sensor 60, or both—is low. The one or more user notification components may comprise a light indicator for providing a visual indication, a speaker for providing an auditory indication, a vibrating indicator for providing a physical indication, or any combination thereof. For example, in the embodiment shown in FIGS. 5A and 5B, the sensor 40 comprises an LED light indicator 52 and a vibration motor 54.

The sensor 40 may also comprise an on/off switch 56 by which a user may turn the sensor on for use and off so as to save battery life. The on/off switch may be located at a position on the sensor that can be conveniently accessed by a user. For example, in the embodiment shown in FIGS. 5A and 5B, the sensor 40 comprises an on/off button 56 on the top of the wristband 42. The sensor may also comprise one or more ports by which the sensor may be plugged into a power source in order to recharge the battery. For example, in the embodiment shown in FIGS. 5A and 5B, the sensor 40 comprises a port 58 by which the battery may be plugged into a USB port, a wall socket, or another power source. In some embodiments, the sensor 40 may also comprise one or more ports by which the sensor can be connected to the power assist system 10 using a wired connection. A wired connection may be used either in place of a wireless connection or as an alternative, e.g. a back-up connection, to a wireless connection.

In some embodiments, the sensor 40 may also comprise one or more protective layers. For example, in the embodiment shown in FIGS. 5A and 5B, the sensor 40 comprises a moisture-sealing layer 62, which protects the electrical components of the sensor from moisture that may enter the enclosure through contact with the skin. Although not shown in the Figures, the sensor 40 may also comprise a moisture-sealing layer 62 to protect the electrical components of the sensor from moisture that may enter the enclosure through precipitation, the spilling of fluids, and the like. In some embodiments, for example, the sensor 40 may be configured to have water-resistant or water-proof properties.

The present technology has now been described in such full, clear, concise and exact terms as to enable any person skilled in the art to which it pertains, to practice the same. It is to be understood that the foregoing describes preferred embodiments and examples of the present technology and that modifications may be made therein without departing from the spirit or scope of the invention as set forth in the claims. Moreover, it is also understood that the embodiments shown in the drawings, if any, and as described above are merely for illustrative purposes and not intended to limit the scope of the invention. As used in this description, the singular forms "a," "an," and "the" include plural reference such as "more than one" unless the context clearly dictates otherwise. Finally, all references cited herein are incorporated in their entirety.

What is claimed is:

1. A system for providing an assistive driving force to a wheelchair comprising:
   (a) a power assist system comprising
      a circuit board, a motion sensing system configured to detect the motion of the power assist system, and a power assist drive system; and (b) a sensor configured to be worn by a user and to detect a motion of a user's hand, the sensor being in communication with the power assist system;

wherein the circuit board is configured to
i. determine when the wheelchair is being manually pushed based on a combination of
an acceleration of the power assist system detected by the motion sensing system, and
a user motion detected by the sensor that indicates a manual push,
and respond to the manual push by activating an assistive drive force;
ii. determine when the wheelchair is being manually braked based on a combination of
a deceleration of the power assist system detected by the motion sensing system, and
a user motion detected by the sensor that indicates a manual brake,
and respond to the manual brake by deactivating an assistive drive force; or
iii. both i. and ii.

2. The system of claim 1, in which the sensor is configured to be worn on a user's wrist.

3. The system of claim 1, in which the sensor comprises one or more accelerometers, one or more gyroscopes, or a combination thereof.

4. The system of claim 3, in which the sensor also comprises one or more magnetometers.

5. The system of claim 1, in which the sensor communicates with the power assist system using a wireless connection.

6. The system of claim 1, in which the circuit board is configured to determine if the wheelchair is being manually pushed based on a combination of
an acceleration of the power assist system detected by the motion sensing system, and
a user motion detected by the sensor that indicates a manual push,
and to respond to the manual push by activating an assistive drive force.

7. The system of claim 6, in which the level of assistive drive force is based, as least in part, on the user motion detected by the sensor.

8. The system of claim 7, in which the circuit board is configured to determine the level of assistive drive force using a combination of
(a) a measured acceleration of the power assist system, and
(b) the user motion detected by the sensor.

9. The system of claim 1, in which the circuit board is configured to determine if the wheelchair is being manually braked based on a combination of
a deceleration of the power assist system detected by the motion sensing system, and
a user motion detected by the sensor that indicates a manual brake,
and to respond to the manual brake by deactivating an assistive drive force.

10. The system of claim 1, in which the sensor comprises a user notification component that is configured to indicate when a manual push is registered, when a manual brake is registered, or both.

11. The system of claim 10, in which the user notification component comprises a light, a speaker, a vibrating indicator, or a combination thereof.

12. A wheelchair comprising the assistive drive force system of claim 1.

13. The system of claim 1, in which the circuit board is configured to both
i. determine if the wheelchair is being manually pushed based on a combination of an acceleration of the power assist system detected by the motion sensing system, and
a user motion detected by the sensor that indicates a manual push,
and respond to the manual push by activating an assistive drive force; and
ii. determine if the wheelchair is being manually braked based on a combination of a deceleration of the power assist system detected by the motion sensing system, and
a user motion detected by the sensor that indicates a manual brake,
and respond to the manual brake by deactivating an assistive drive force.

* * * * *